March 13, 1962   R. H. WARNKE   3,024,587
LAWN RAKE
Filed June 15, 1959   2 Sheets-Sheet 1
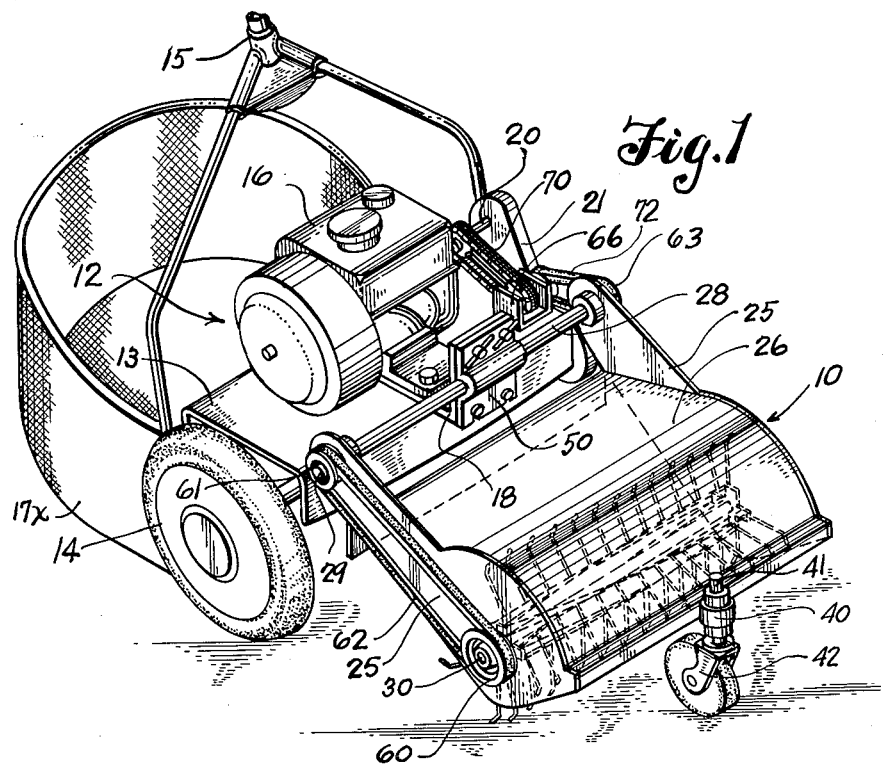
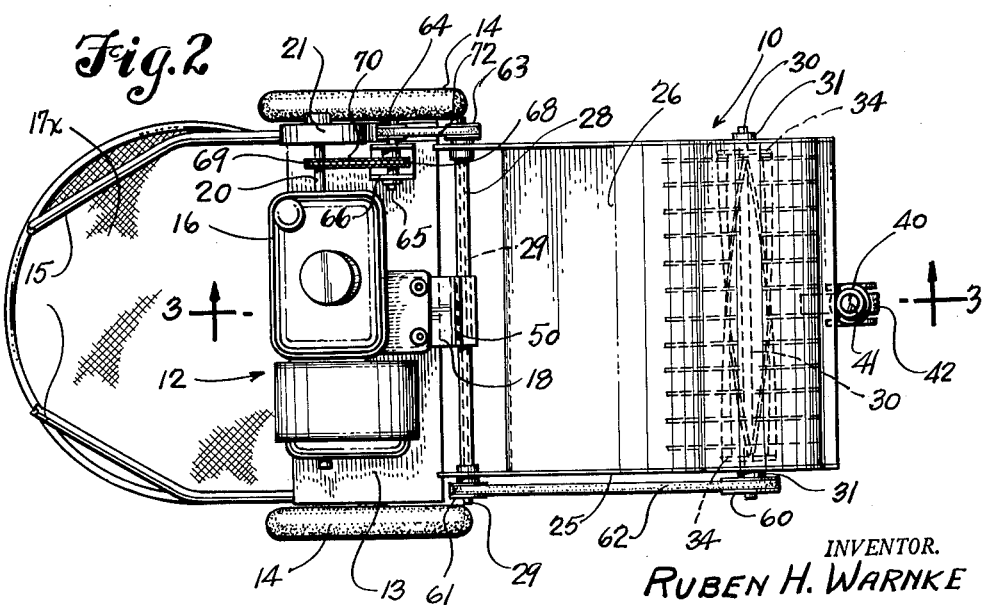
INVENTOR.
RUBEN H. WARNKE
BY
Robinson & Berry
ATTORNEYS March 13, 1962     R. H. WARNKE     3,024,587
LAWN RAKE
Filed June 15, 1959     2 Sheets-Sheet 2
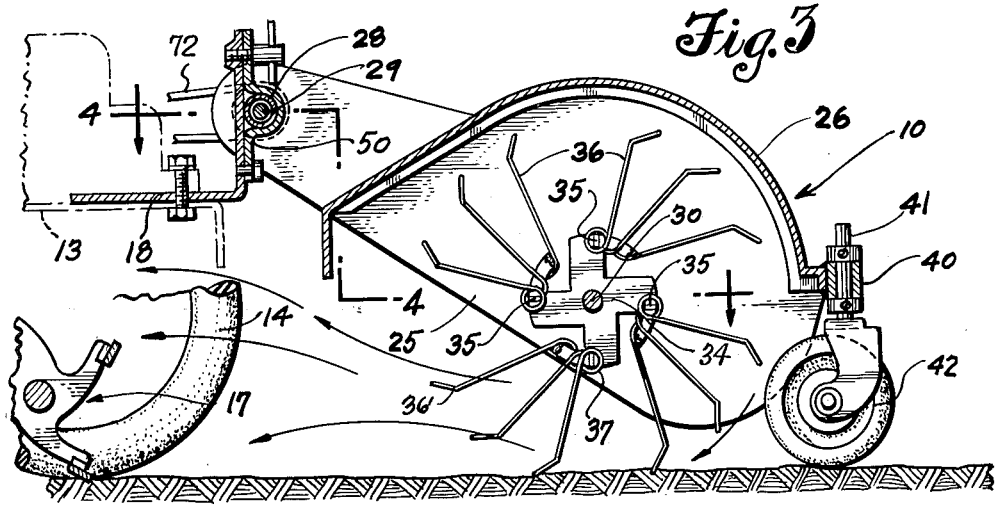
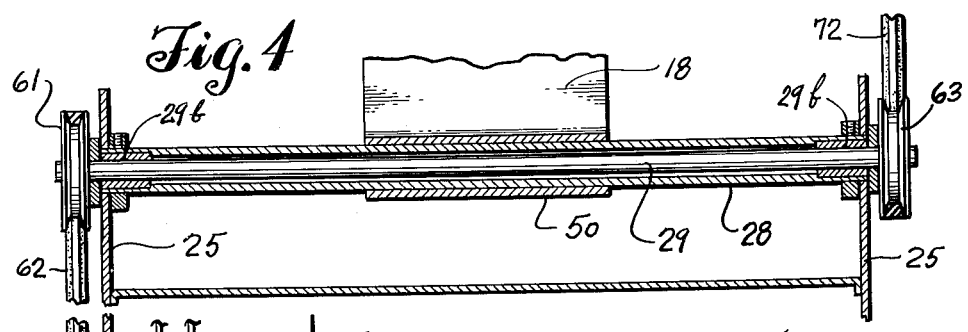
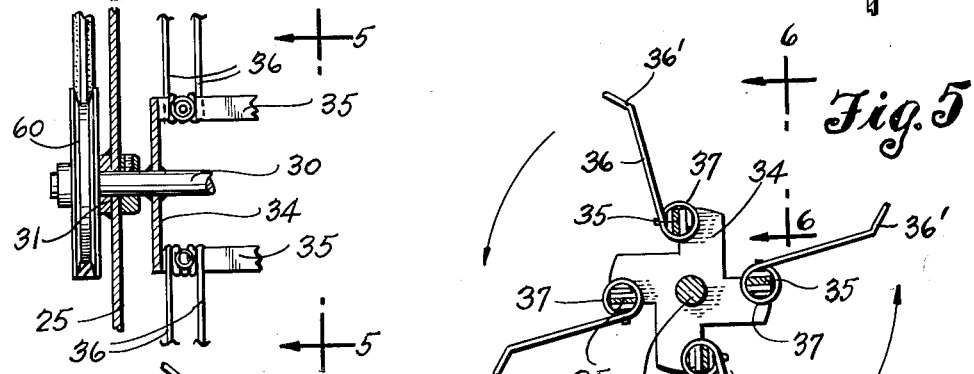
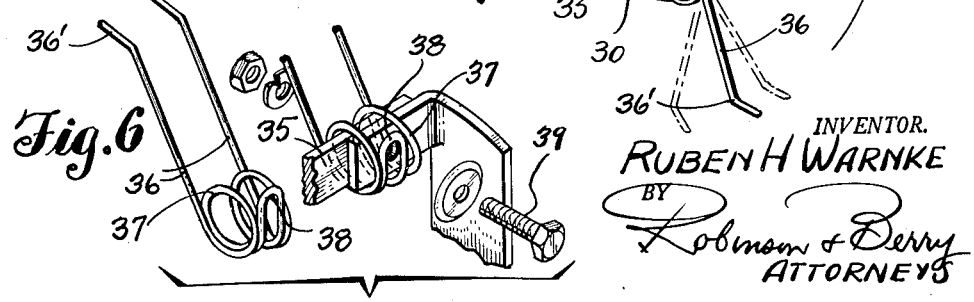
INVENTOR.
RUBEN H WARNKE
BY
Robinson & Berry
ATTORNEYS

United States Patent Office 3,024,587
Patented Mar. 13, 1962

3,024,587
LAWN RAKE
Ruben H. Warnke, 4045 48th Ave. SW., Seattle, Wash.
Filed June 15, 1959, Ser. No. 820,230
2 Claims. (Cl. 56—27)

This invention relates to lawn rakes and more particularly to a lawn rake that is designated as an attachment device for a lawn mower for raking the grass ahead of the mower's grass cutting blades.

It is the principal object of the present invention to provide a rake of reel form; that will operate to straighten up the down or matted grass; that will clear the turf of leaves, moss and cuttings that have a tendency to choke the grass and retard its proper growth, and thus eliminating the need of hand raking the turf. Furthermore, to do this at the same time the grass is being cut and gathered in the usual grass catcher.

It is also an object of this invention to provide an attachment device of the kind or character above stated, that can be easily and readily applied to and removed from most of the present day types of power driven lawn mowers and is equipped with means that adapts it to be driven through an easily applied belt connection with the power system of the lawn mower with which it is being used.

Yet another object of this invention is to provide an attachment means in the form of a readily releasable clamp for the functional attachment of the rake to the lawn mower in advance of its grass cutting blades.

A further object of the invention is to provide a grass raking reel having spring wire tines and mountings therefor, of novel and advantageous form that clear themselves and deposit the moss, leaves and cuttings into the whirling mower reel, which, in turn deposits these rakings in the grass catcher as attached to the mower.

Yet another object of the invention is to provide the grass raking part with a supporting caster wheel at its forward end to facilitate the steering and use of the rake without detriment to its up and down pivotal movements in accordance with ground surface irregularities.

Still further objects of the invention reside in the details of construction and combination embodied in the invention and in the mode of operation and use of the combination, as will hereafter be fully described.

In accomplishing the above-mentioned and other objects of the invention, I have provided the improved details of construction, the preferred forms of which are illustrated in the accompanying drawings, wherein—

FIG. 1 is a perspective view, showing the manner of applying the present grass raking attachment to a typical, reel-type lawn mower as equipped with a grass catcher.

FIG. 2 is a top view of the combined parts.

FIG. 3 is an enlarged vertical section of the mower and rake; the section being taken on line 3—3 in FIG. 2.

FIG. 4 is a sectional detail, showing the raking device as mounted by the releasable clamp and its drive shaft as equipped for connection with the lawn mower; this section being taken substantially on line 4—4 in FIG. 3.

FIG. 5 is a cross-section of the raking reel, taken on the line 5—5 in FIG. 4.

FIG. 6 is a fragmental perspective view of certain parts of the reel of the lawn rake, as seen when looking toward them through the plane of line 6—6 in FIG. 5.

Referring more in detail to the drawings—

The presently described combination of parts comprises the grass rake, which is designated in its entirety by reference numeral 10, and the lawn mower, which is designated in its entirety by reference numeral 12.

The lawn mower 12 may be any one of the most commonly used present day power driven types, and is here shown to have a frame structure, including a horizontal plate or platform 13, that is supported at its opposite ends by a pair of ground wheels 14—14 and is equipped with a handle 15 of suitable kind for controlling its direction of travel and operation. Also, it is herein shown that the frame plate 13 mounts an engine 16 thereon which may have any suitable driving connection with the wheels 14 and grass cutting reel 17 of the mower that has been indicated only in FIG. 3. Also, it has been shown in FIGS. 1 and 2, that the mower is equipped with the usual grass catcher, designated at 17x which plays an important part in this combination. Also, the plate 13 mounts a bracket 18 of right angular form centrally thereon at its forward edge for a purpose that will presently be explained.

The engine 16 of the lawn mower has its drive shaft 20 extended therefrom to one side of the frame structure as in FIG. 2, where a chain driving belt connection, represented at 21, is made with the mower wheels and reel. This form of connection will not be further described since it forms no particular part of the present invention, but will be referred to again in connection with the driving means provided for the rake reel and its operation.

The rake 10, as seen in FIGS. 1, 2 and 3, comprises a frame structure including parallel and vertical opposite side plates 25—25 that are joined in laterally spaced relationship by an upwardly arched and rearwardly directed top plate or hood 26. The side plates 25 extend somewhat rearwardly of the hood as seen in FIGS. 3 and 4, and at their rear ends, rigidly support therein a horizontal tubular cross-shaft 28 within which a drive shaft 29 is revolubly contained with its opposite ends extended slightly beyond the ends of the tubular cross-shaft.

Located between the forward end portions of the two side plates 25—25, beneath the hood 26, is the grass raking reel. This comprises a center drive shaft 30 that extends revolubly through the side plates 25—25 within mounting bearings 31—31 applied to the plates, as well shown in FIG. 4. Fixedly mounted on the opposite end portions of the center shaft 30, adjacent and at the inside of the side plates 25—25, are reel end frames or spider plates 34—34 and extended between these plates, equally spaced apart, outwardly from and parallel with the center shaft 30, are crossbars 35 on which, at regularly spaced intervals therealong, are paired raking tines 36—36. As shown best in FIG. 6, each pair of tines is formed from a continuous piece of spring wire that is bent medially of its ends to provide the paired tines 36—36 and these are continued into and are joined at their inner ends by a mounting portion common to both tines, that is formed into a coil 37 through which the cross bar 35 extends. At their outer ends, the end portions of the tines are inclined forwardly, as shown at 36' in FIG. 5, to obtain a better raking result. In the bending of the wires to provide the two tines and coils 37, a sharp bend, as at 38 is made and after the coils have been applied to the bars 35, a bolt 39 is applied therethrough and threaded into or applied through the mounting bar thus to anchor the pair of tines in raking position, as shown in FIG. 5. It is also anticipated that the cross-bars 35 may be bent in such manner as to extend spirally along the reel, if this is desired.

Applied to the forward end of the reel frame, midway of its ends, is a bearing 40 in which the vertical mounting stem 41 of a caster form of wheel 42 is rotatably contained. This wheel is to give support to the forward end of the rake and to coact with the rear end support, presently to be explained, to hold the raking reel in proper and predetermined relationship to the grass being cut and raked.

For the detachable connecting of the rear end of the rake frame to the mower, I have provided a clamp plate 50 for application to the front face of the vertical part of the bracket 18. This clamp plate is bent to form it with a transverse channel or seat therein in which the tubular cross-shaft 28 may be received and secured, as well shown in FIG. 3. Then, when the plate 50 is applied over shaft 18 and bolted to the bracket as shown in FIG. 3, it operates to clamp, secure and support this end of the rake in proper raking condition. Elevational adjustment of the rake may be effected by caster adjustment or clamp plate adjustment.

The rotary driving of the raking reel is effected by a belt driving connection with the reel shaft 30. For this purpose the shaft 30 has a belt pulley wheel 60 fixed to one end thereof and the cross-shaft 29 that is contained coaxially in the tubular shaft 28 and revolvably contained in supporting bearings 29b, is equipped, at the corresponding end, with a similar belt pulley wheel 61. A driving belt 62 operates about these pulley wheels. Also, the cross-shaft 29 is equipped at the end opposite that mounting the pulley wheel 61, with a pulley wheel 63, which is in alignment with a smaller diameter pulley wheel 64 fixed on a short shaft 65, see FIG. 2, mounted in a support 66 that is mounted upon and fixed to the mower platform 13. Also shaft 65 is equipped with a small diameter sprocket wheel 68 that is aligned with a similar sprocket wheel 69 on the motor driven shaft 20 and a sprocket chain belt 70 operates about these sprocket wheels and a V-belt 72 operates about the pulley wheels 63 and 64. Thus, the raking reel will be driven by the motor of the mower through the belt connection 70, 72 and 62.

As the mower moves forwardly, the rake is advanced accordingly, and by reason of its pivoted attachments to the mower by clamp plate 50, and the rolling support at its forward end, as provided by the caster wheel 42, it will maintain a uniform raking height when moved over uneven surfaces.

In operation, the rake reel rotates in the direction indicated by the arrow in FIG. 5 and the tines 36 yield as required to avoid damage to tines or ground surface. The rake will operate to straighten up down and matted grass, rid the turf of cuttings, moss and leaves that have a tendency to choke the grass and retard proper growth. Rakings are thrown back, as indicated by the arrows shown in FIG. 3 and are relayed by the mower reel 17 into the grass catcher 17x. This is one of the advantages in the use of this particular combination of parts. The use of this rake makes possible a smoother cut and results in a better appearing lawn. Periodic use of this rake eliminates the need of hand raking, stimulates the growth of the grass, and results in a healthier, and better appearing lawn.

Rakes of this kind may be made in various sizes as may be desired or required and can be attached and driven in various ways without departing from the spirit of the invention.

I claim:

1. A rake attachment for a lawn mower comprising a pair of laterally spaced side plates, a hood extending between and joining said plates in parallel relationship, said hood being joined to said plates along the forward and top edges thereof, a horizontal mounting shaft extending between said plates at their rearward end, a rake mounting shaft rotatably mounted in and extending between said side plates intermediate the ends thereof, a grass raking reel mounted on said rake mounting shaft, a drive shaft rotatably mounted in said horizontal mounting shaft and extending beyond the opposite ends thereof, a driving connection between the lawn mower and one end of said drive shaft, a driving connection between the other end of said drive shaft and said rake mounting shaft, a caster wheel mounted on the forward edge of said hood for supporting the forward end of the attachment and means secured to said horizontal mounting shaft for supporting the rearward end of the rake attachment and for securing the rake attachment to the lawn mower.

2. A rake attachment for a lawn mower comprising a pair of laterally spaced side plates, a hood extending between and joining said plates in spaced, parallel relationship, said hood being joined to said plates along the forward and top edges thereof, a horizontal mounting shaft extending between and pivotally mounting said plates at their rearward ends, a rake mounting shaft rotatably mounted in and extending between said side plates intermediate the ends thereof, a grass raking reel mounted on said rake mounting shaft, a pair of rotatable pulleys mounted by said horizontal mounting shaft, a driving belt between the lawn mower and one of said pulleys, a pulley on one end of said rake mounting shaft aligned with one of said pair of pulleys, a driving belt between the other of said pair of pulleys, a caster wheel mounted on the forward edge of said hood for supporting the forward end of the attachment and means secured to said horizontal mounting shaft for supporting the rearward end of the rake attachment and for securing the rake attachment to the lawn mower.

References Cited in the file of this patent

UNITED STATES PATENTS

| | | |
|---|---|---|
| 1,538,381 | Bull | May 19, 1925 |
| 2,032,777 | Thomas | Mar. 3, 1936 |
| 2,722,795 | Warner | Nov. 8, 1955 |
| 2,826,034 | Feuerlein | Mar. 11, 1958 |